United States Patent
Callaway et al.

(10) Patent No.: US 7,294,383 B2
(45) Date of Patent: *Nov. 13, 2007

(54) MOLDABLE CONSTRUCTION INCORPORATION NON-OLEFIN BONDING INTERFACE

(75) Inventors: Brian Callaway, Moore, SC (US); Koen C. G. Steen, Erondegem (BE); Howell B. Eleazer, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/518,963

(22) Filed: Sep. 11, 2006

(65) Prior Publication Data

US 2007/0071940 A1    Mar. 29, 2007

Related U.S. Application Data

(63) Continuation of application No. 11/235,941, filed on Sep. 27, 2005.

(51) Int. Cl.
*B32B 3/06*    (2006.01)
*B32B 5/08*    (2006.01)
*B32B 5/12*    (2006.01)
*B32B 5/26*    (2006.01)
*B32B 7/08*    (2006.01)
*B32B 7/10*    (2006.01)

(52) U.S. Cl. .................... 428/86; 428/96; 428/102; 428/119; 442/186; 442/199; 442/239; 442/255

(58) Field of Classification Search ............ 428/86, 428/88, 92, 95, 96, 102, 119; 442/185, 186, 442/189, 199, 239, 246, 255, 263, 192, 195

See application file for complete search history.

(56) References Cited

U.S. PATENT DOCUMENTS

| | | | | |
|---|---|---|---|---|
| 4,309,487 A | | 1/1982 | Holmes | 428/516 |
| 4,316,933 A | * | 2/1982 | Fraser | 442/255 |
| 4,426,415 A | * | 1/1984 | Avery | 428/17 |
| 4,705,706 A | * | 11/1987 | Avery | 428/17 |
| 4,980,227 A | | 12/1990 | Sekiguchi et al. | 442/3 |
| 5,077,935 A | * | 1/1992 | Stoever et al. | 47/9 |
| 5,124,195 A | | 6/1992 | Harpell et al. | 428/152 |
| 5,137,393 A | * | 8/1992 | Fuhr et al. | 405/129.9 |

(Continued)

FOREIGN PATENT DOCUMENTS

DE    198 23 926    12/1999

(Continued)

*Primary Examiner*—Cheryl Juska
(74) *Attorney, Agent, or Firm*—Terry T. Moyer; Cheryl J. Brickey

(57) ABSTRACT

A composite construction incorporating one or more mat layers of interwoven axially drawn heat fusible tape fiber elements. The axially drawn tape fiber elements incorporate a central or base layer of a strain oriented polymer with a covering layer of a heat fusible polymer. The covering layer of the tape fiber elements is characterized by a softening point below that of the base layer to permit bonding fusion upon application of heat. An arrangement of embedded non-olefin fiber elements extends in anchored relation at least partially across the thickness dimension of the mat structure. The composite is adapted for bonding to a substrate layer. An optional covering layer may be utilized.

17 Claims, 9 Drawing Sheets

U.S. PATENT DOCUMENTS

| | | | | |
|---|---|---|---|---|
| 5,436,064 A * | 7/1995 | Schnegg et al. | ............ | 442/203 |
| 5,437,905 A | 8/1995 | Park | ............ | 428/105 |
| 5,443,882 A | 8/1995 | Park | ............ | 428/103 |
| 5,443,883 A | 8/1995 | Park | ............ | 428/103 |
| 5,529,826 A * | 6/1996 | Tailor et al. | ............ | 428/110 |
| 5,547,536 A | 8/1996 | Park | ............ | 156/292 |
| 5,578,370 A | 11/1996 | Ferrar et al. | ............ | 428/288 |
| 5,635,288 A | 6/1997 | Park | ............ | 428/105 |
| 5,643,390 A | 7/1997 | Don et al. | ............ | 156/307.1 |
| 5,861,202 A | 1/1999 | Kimura et al. | ............ | 428/105 |
| 5,877,096 A * | 3/1999 | Stevenson et al. | ............ | 442/36 |
| 5,879,492 A * | 3/1999 | Reis et al. | ............ | 156/72 |
| 5,891,549 A * | 4/1999 | Beretta et al. | ............ | 428/100 |
| 5,925,434 A * | 7/1999 | Phillips et al. | ............ | 428/95 |
| 5,935,651 A | 8/1999 | Klocek et al. | ............ | 427/256 |
| 5,935,678 A | 8/1999 | Park | ............ | 428/105 |
| 5,962,101 A * | 10/1999 | Irwin et al. | ............ | 428/92 |
| 6,054,086 A | 4/2000 | Kurihara et al. | ............ | 264/147 |
| 6,083,583 A | 7/2000 | Klocek et al. | ............ | 428/182 |
| 6,127,293 A | 10/2000 | Kimura et al. | ............ | 442/199 |
| 6,156,679 A | 12/2000 | Takaoka et al. | ............ | 442/327 |
| 6,312,638 B1 | 11/2001 | Ward et al. | ............ | 264/322 |
| 6,328,923 B1 | 12/2001 | Jones et al. | ............ | 264/494 |
| 6,458,727 B1 | 10/2002 | Jones et al. | ............ | 442/409 |
| 6,475,592 B1 * | 11/2002 | Irwin | ............ | 428/95 |
| 6,479,125 B1 * | 11/2002 | Irwin, Sr. | ............ | 428/95 |
| 6,509,105 B2 | 1/2003 | Olvey | ............ | 428/481 |
| 6,645,610 B1 * | 11/2003 | Reis et al. | ............ | 428/297.4 |
| 6,740,386 B2 * | 5/2004 | Hutchison | ............ | 428/88 |
| 6,824,863 B1 | 11/2004 | Kitayama et al. | ............ | 428/299.7 |
| 6,866,912 B2 * | 3/2005 | Higgins et al. | ............ | 428/95 |
| 6,897,170 B2 * | 5/2005 | Barkis et al. | ............ | 442/195 |
| 6,949,280 B2 | 9/2005 | Brillhart, III et al. | ............ | 428/105 |
| 7,160,599 B2 | 1/2007 | Hartman | ............ | 428/95 |
| 2003/0175474 A1 * | 9/2003 | Higgins et al. | ............ | 428/95 |
| 2003/0175475 A1 * | 9/2003 | Higgins et al. | ............ | 428/95 |
| 2003/0178122 A1 * | 9/2003 | Ianniello et al. | ............ | 156/71 |
| 2003/0224143 A1 * | 12/2003 | Ianniello et al. | ............ | 428/137 |
| 2004/0242103 A1 | 12/2004 | Loos et al. | ............ | 442/185 |
| 2005/0003727 A1 | 1/2005 | Chiou | ............ | 442/239 |
| 2005/0233107 A1 | 10/2005 | Hartman | ............ | 428/95 |
| 2006/0151104 A1 | 7/2006 | Jacobs et al. | ............ | 156/308.2 |
| 2007/0071940 A1 * | 3/2007 | Callaway et al. | ............ | 428/92 |
| 2007/0071941 A1 * | 3/2007 | Eleazer et al. | ............ | 428/92 |
| 2007/0071942 A1 * | 3/2007 | Callaway et al. | ............ | 428/95 |
| 2007/0122586 A1 | 5/2007 | Hartman | ............ | 428/95 |

FOREIGN PATENT DOCUMENTS

| | | |
|---|---|---|
| EP | 0 344 318 | 12/1989 |
| EP | 0 733 460 | 9/1996 |
| EP | 0 733 476 | 9/1996 |
| EP | 0 872 586 | 10/1998 |
| EP | 1 21 338 | 6/2002 |
| EP | 1 650 021 | 4/2006 |
| GB | 1 387 701 | 3/1975 |
| JP | 62 90317 | 4/1987 |
| JP | 07300763 | 11/1995 |
| JP | 10 251956 | 9/1998 |
| JP | 2000008244 | 1/2000 |
| WO | WO 98/12370 | 3/1998 |
| WO | WO 98/12371 | 3/1998 |
| WO | WO 02090082 | 11/2002 |
| WO | WO 03008190 | 1/2003 |
| WO | WO 03045659 | 6/2003 |
| WO | WO 2004028803 | 4/2004 |
| WO | WO 2006046862 | 5/2006 |

\* cited by examiner

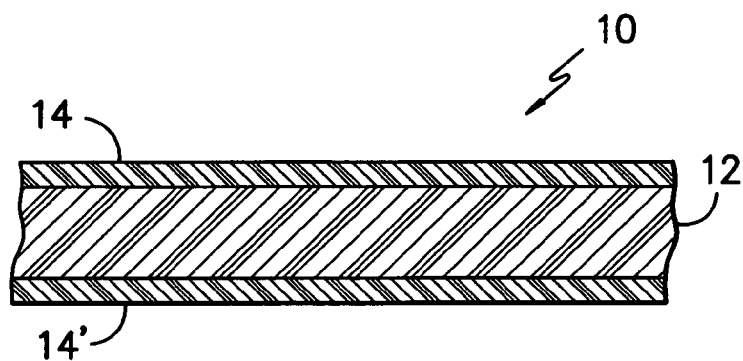
FIG. -1-
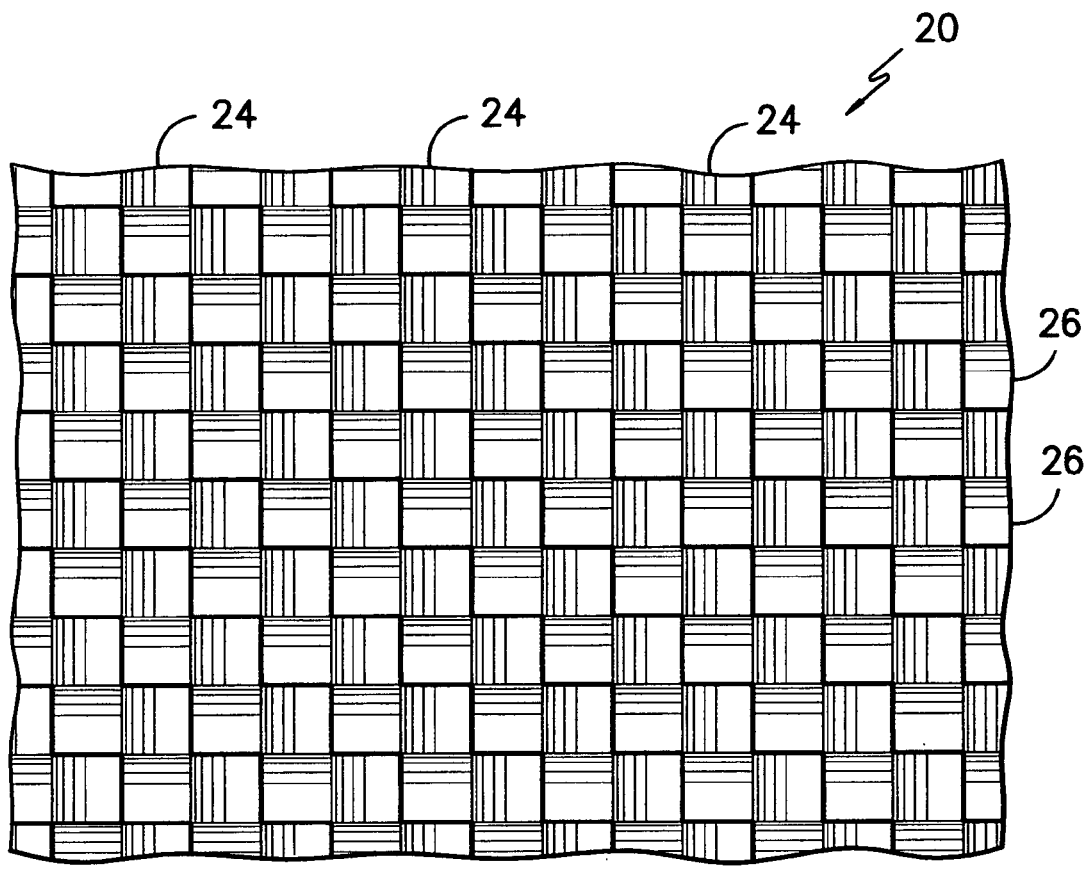
FIG. -2-

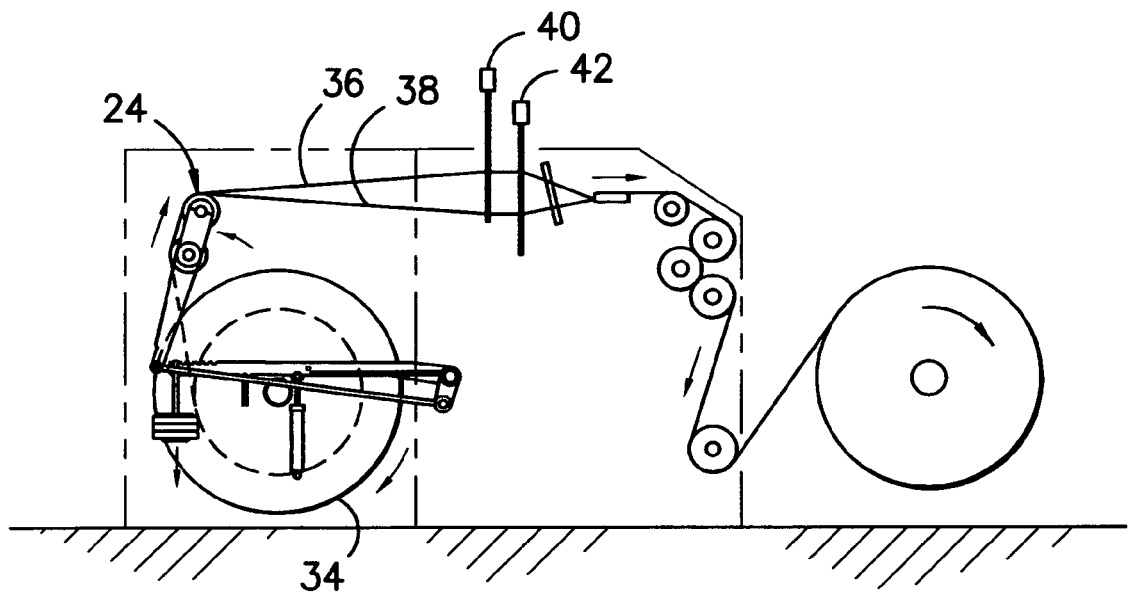
FIG. -3-
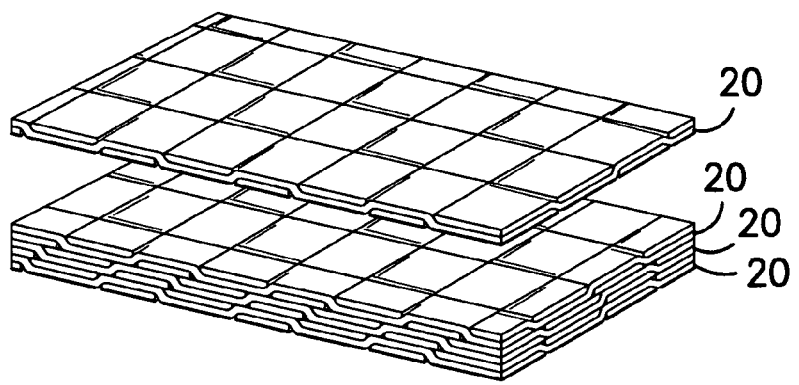
FIG. -4-

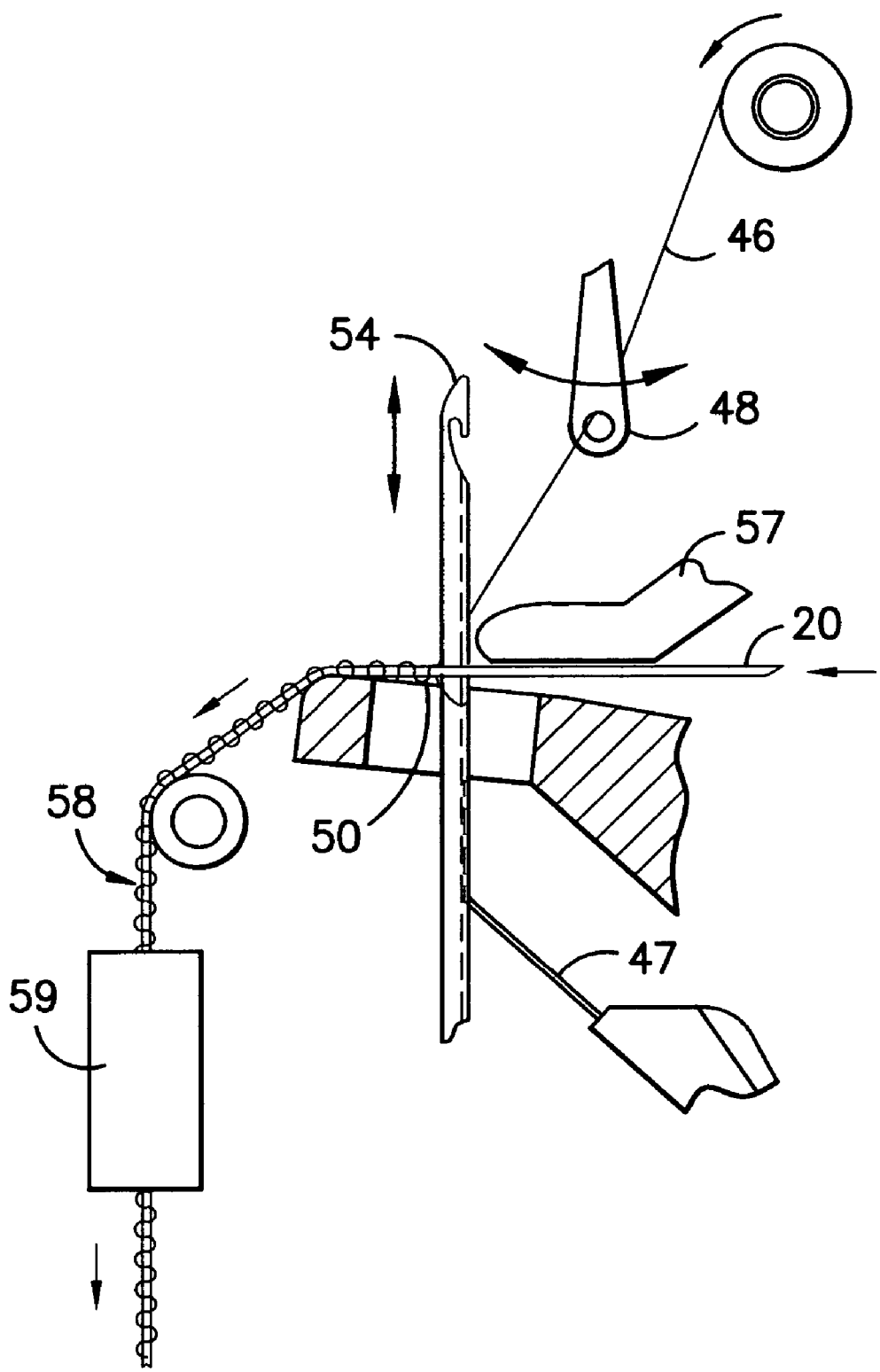
FIG. −5−

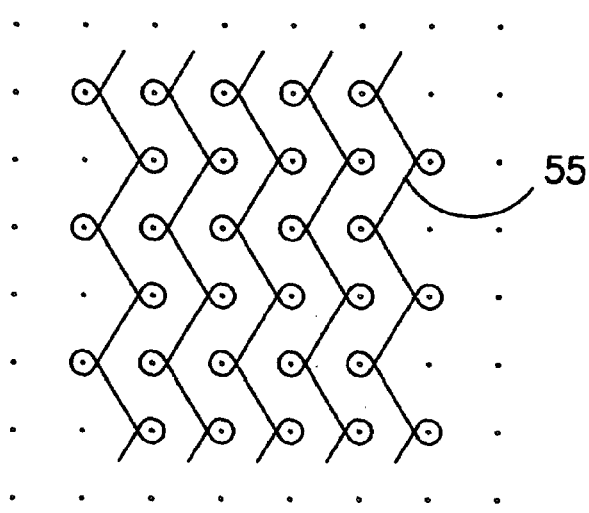
FIG. -6-
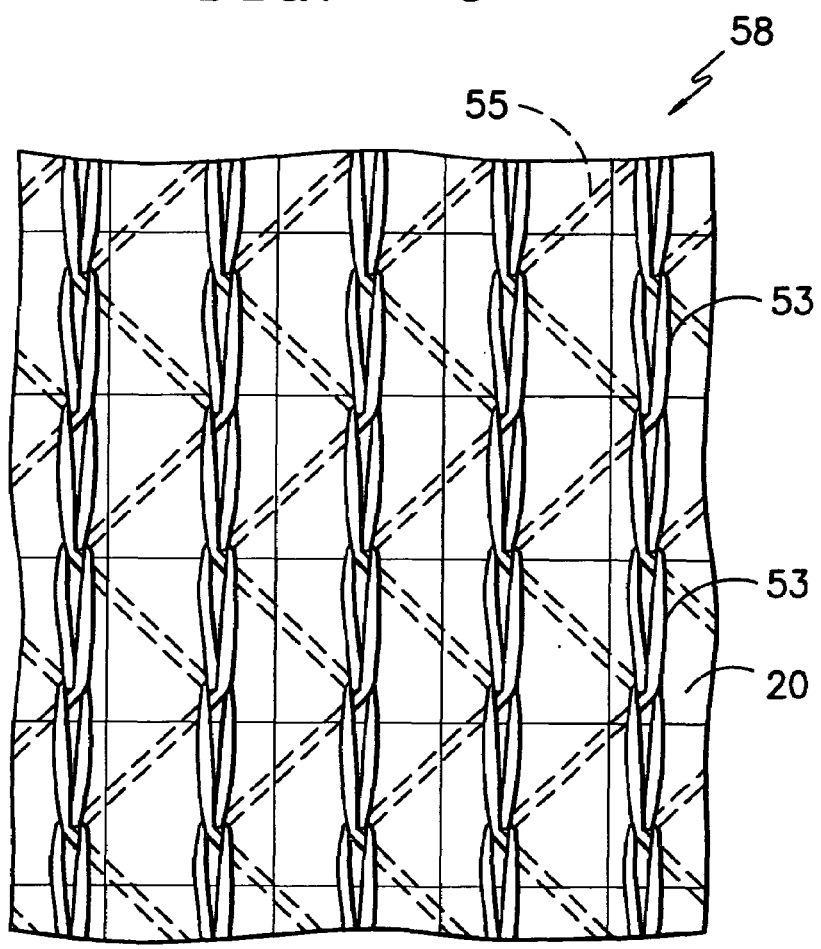
FIG. -7-

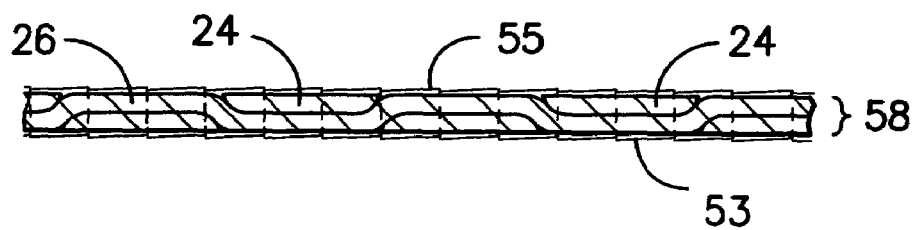
FIG. -8-
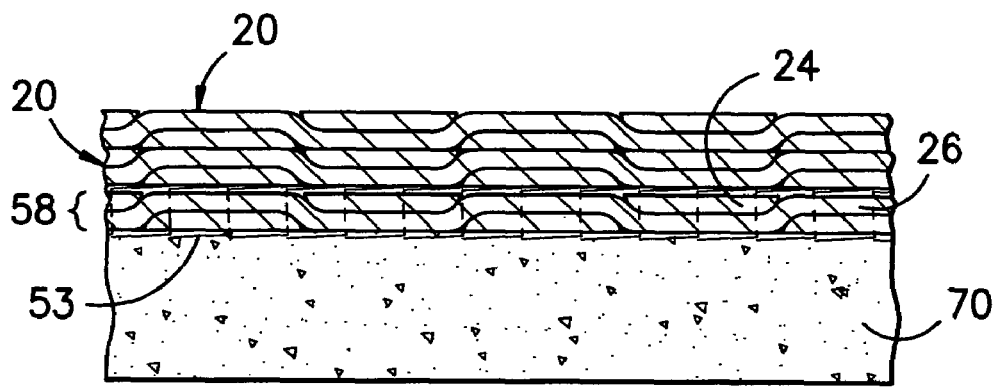
FIG. -9-
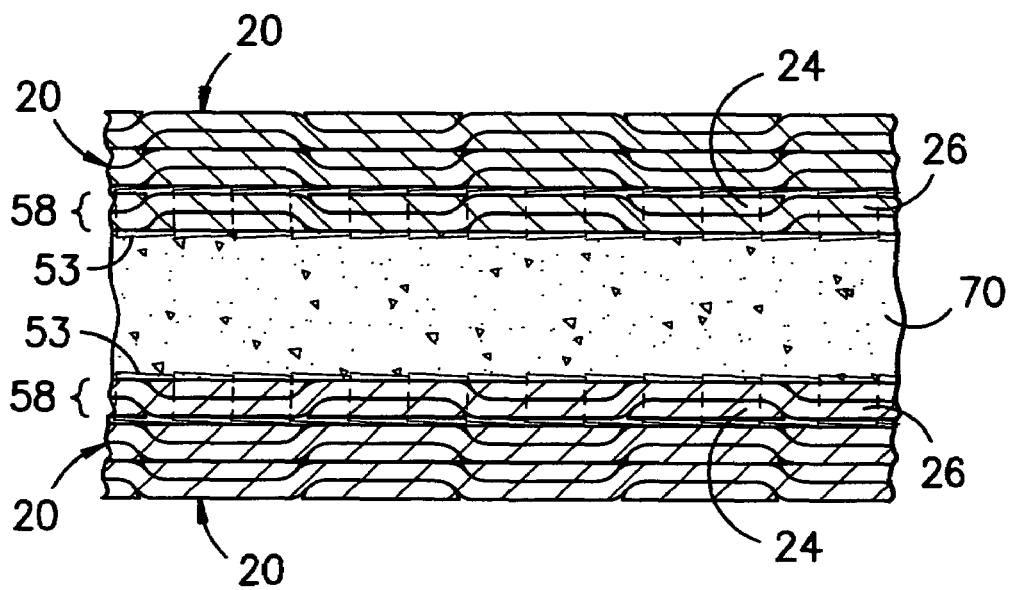
FIG. -10-

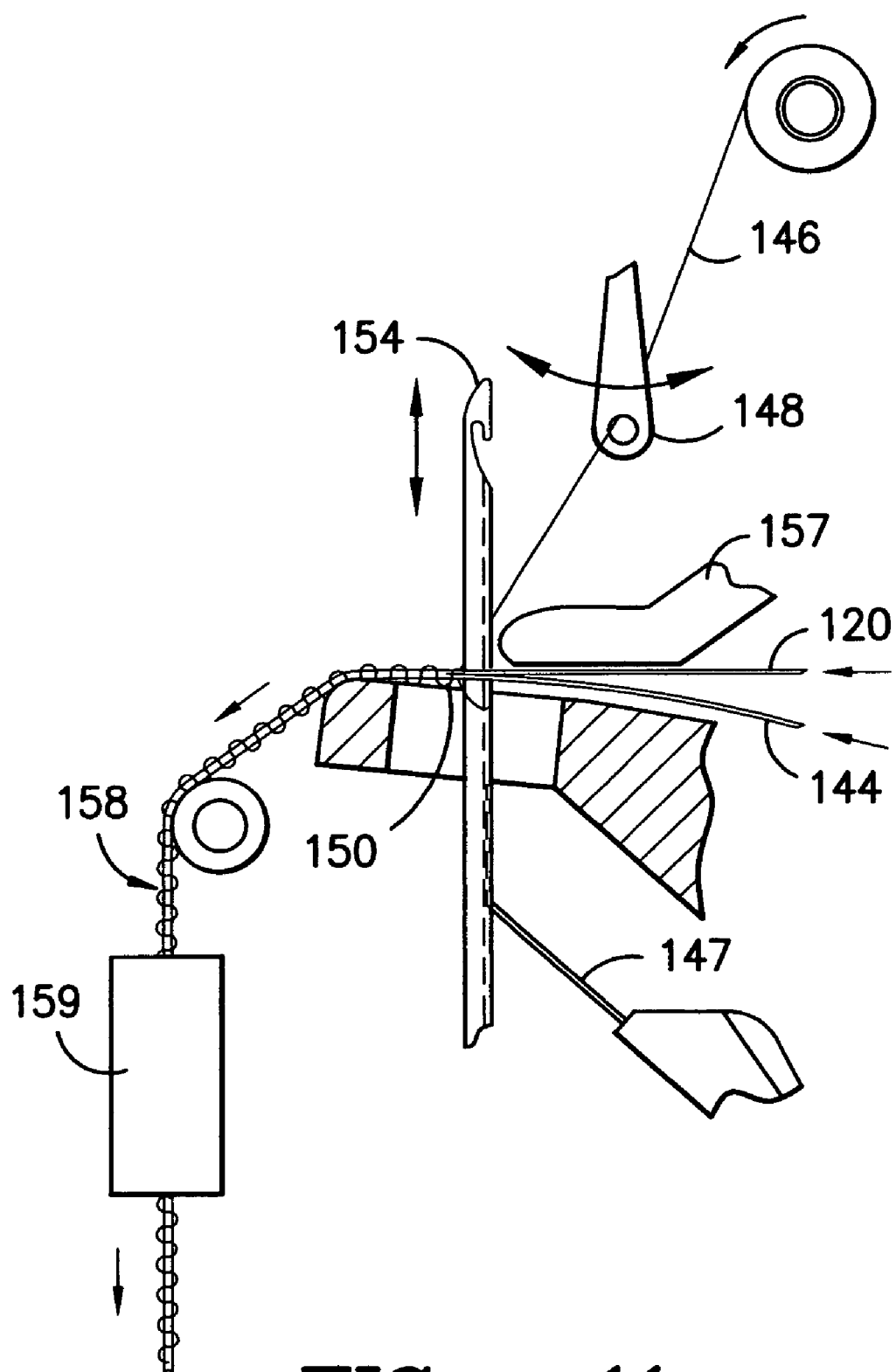
FIG. -11-

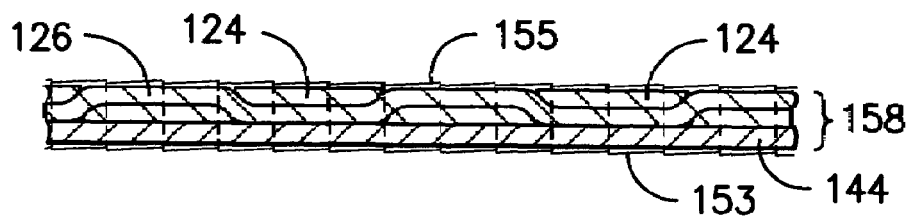
FIG. -12-
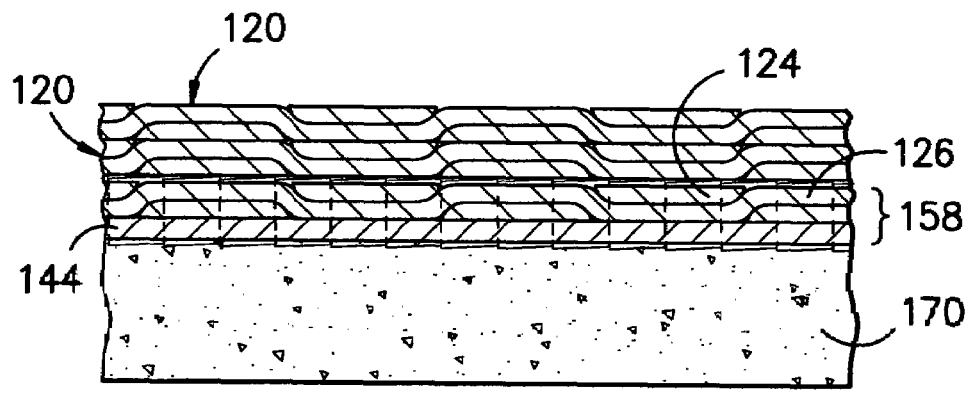
FIG. -13-
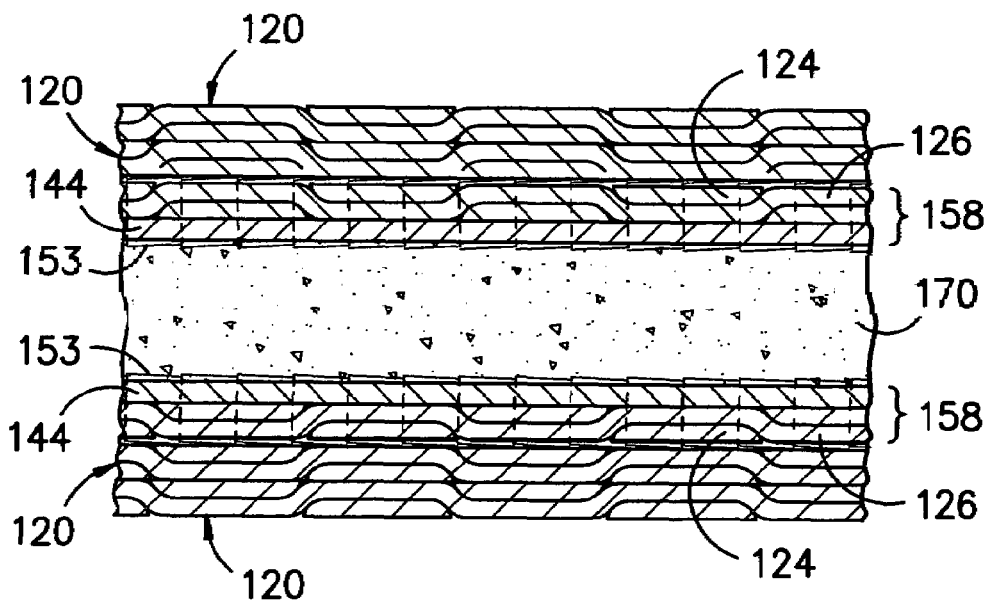
FIG. -14-

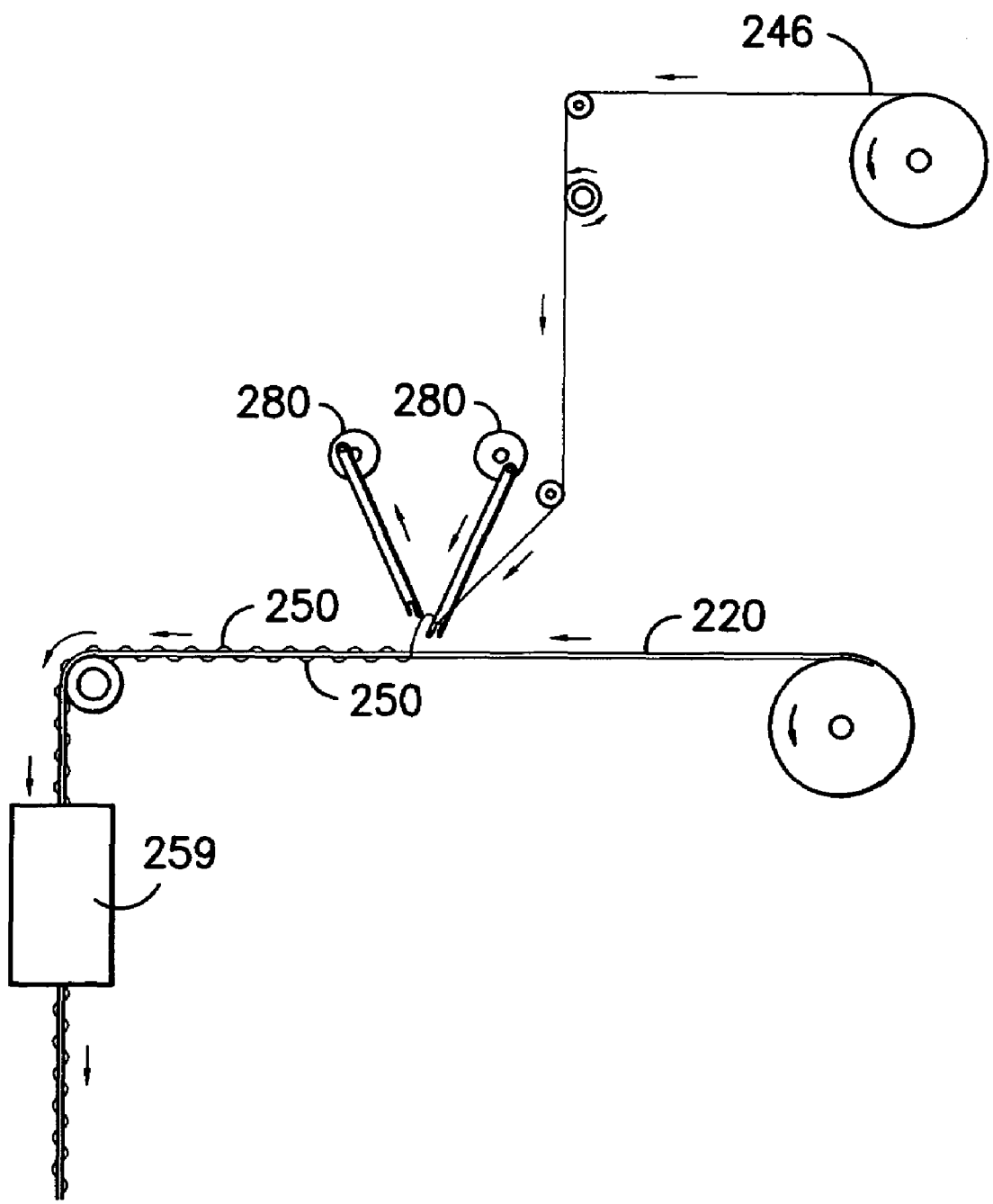
FIG. −15−

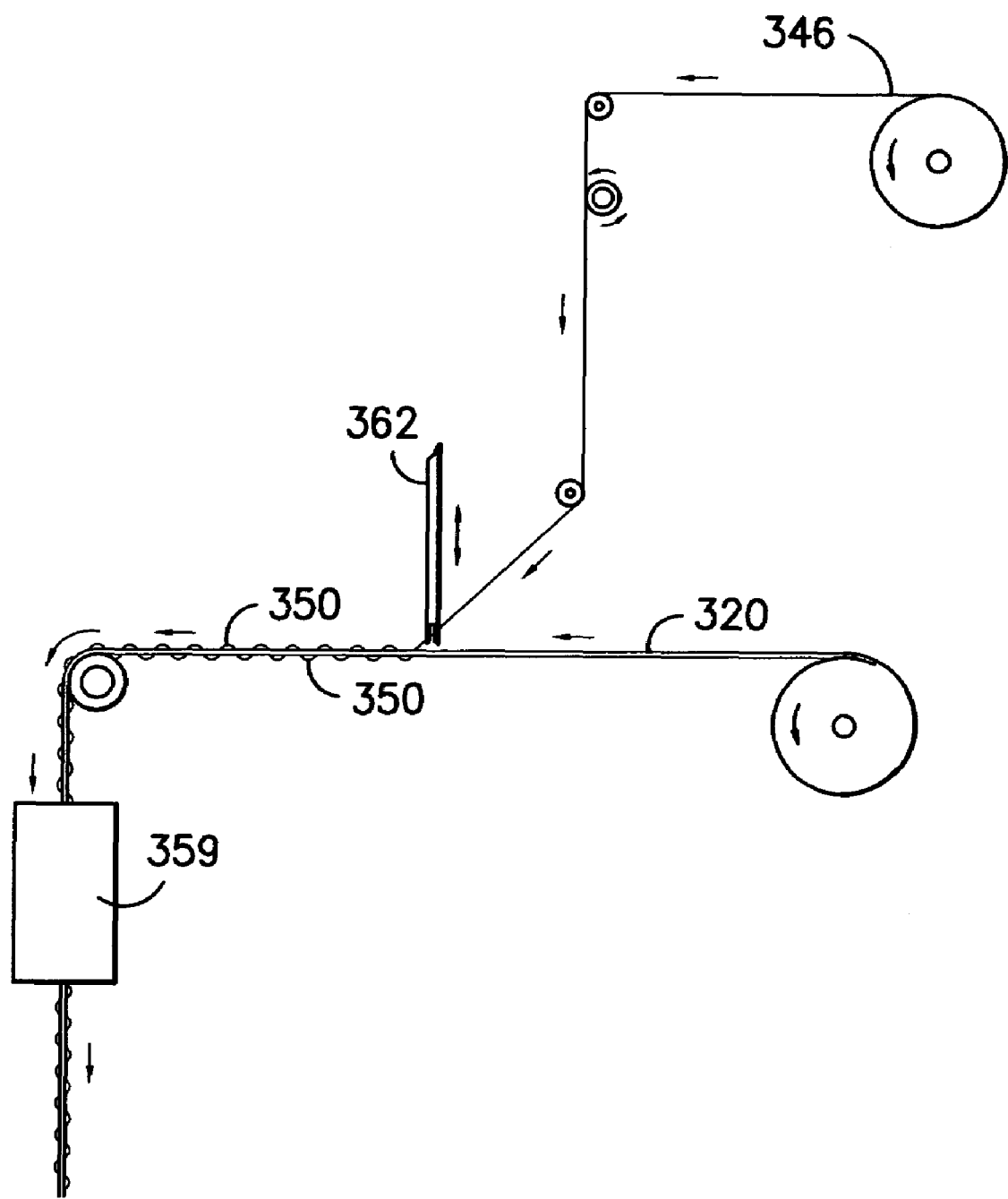
FIG. —16—

MOLDABLE CONSTRUCTION INCORPORATION NON-OLEFIN BONDING INTERFACE

CROSS-REFERENCE

This application, is a continuation application of pending U.S. patent application Ser. No. 11/235,941, filed on Sep. 27, 2005.

TECHNICAL FIELD

This invention relates to a thermoplastic composite material. More particularly, the invention relates to a composite incorporating a mat structure formed from one or more layers of interwoven axially drawn heat fusible tape elements with non-olefin embedded fiber elements anchored within the mat structure to define a substantially secure bondable surface structure in layered relation relative to at least a portion of the mat structure. The embedded fiber elements may substantially form the bondable surface structure or the embedded fiber elements may traverse one or more non-olefin intermediate layers such that the embedded fiber elements and intermediate layers cooperatively define the bondable surface structure. The bondable surface structure is adapted to provide secure bonding to an adhesive or non-adhesive substrate layer when at least partially embedded in contacting relation within such substrate layer. Methods of forming such composite materials are also provided.

BACKGROUND OF THE INVENTION

It has been proposed to form tape structures from polypropylene film that is coated with a layer of propylene copolymer including ethylene units such that the coating has a lower softening point than the core. Such tape structures are disclosed, for example, in U.S. Pat. No. 5,578,370 the teachings of which are herby incorporated by reference in their entirety. U.S. Patent Application 2004/0242103A1 (incorporated by reference) has also proposed to form mono-axially drawn tape structures characterized by substantial draw ratios and incorporating a central layer of a polyolefin with one or two covering layers of a polyolefin from the same class as the central layer. The DSC melting point of the outer layers is lower than that of the central layer to facilitate heat bonding. Such drawn tape elements may be interwoven so as to form a mat structure which is then subjected to heat thereby fusing the tape elements in place. Multiple layers of such interwoven mat structures may be combined to form moldable structures of substantial thickness that may be shaped to three-dimensional configurations.

While the moldable mat structures of the prior art are highly useful for a number of end uses, it has been found that the surface character of the olefin tape elements tends to reduce adhesion between the formed mat and applied substrate layers incorporating materials such as adhesives, resins, foams, plastics, rubbers and the like. In particular, the covering layers of low melting point polyolefin may facilitate delamination. Accordingly, the need exists to provide a system that facilitates lamination while nonetheless maintaining the desirable moldable properties of the mat structures.

SUMMARY OF THE INVENTION

The present invention provides advantages and/or alternatives over the prior art by providing a composite construction incorporating one or more mat layers of interwoven axially drawn tape fiber elements with non-olefin embedded fiber elements anchored within the mat structure. The non-olefin embedded fiber elements operate alone or in conjunction with one or more non-olefin surface layers to define a substantially secure bondable surface structure in layered relation relative to at least a portion of the mat structure. The bondable surface structure is adapted to provide secure bonding to an adhesive or non-adhesive substrate layer when at least partially embedded in contacting relation within such substrate layer.

According to one contemplated aspect, a mat structure is formed from axially drawn tape fiber elements that incorporate a central or base layer of a strain oriented polymer and at least one covering layer of a heat fusible polymer. The covering layer of the tape fiber elements is characterized by a softening point below that of the base layer to permit fusion bonding upon application of heat. A multiplicity of embedded non-olefin fiber elements extends in anchored relation at least partially across the thickness dimension of the mat structure such that at least a portion of the fiber elements project outwardly from the mat structure and the projecting portions define at least a partial surface covering across the mat structure. The composite of the mat with anchored non-olefin fiber elements is moldable to a three-dimensional geometry by application of heat and pressure following formation.

According to another contemplated aspect, a mat structure is formed from axially drawn tape fiber elements incorporating a central or base layer of a strain oriented polymer and at least one covering layer of a heat fusible polymer. The covering layer of the tape fiber elements is characterized by a softening point below that of the base layer to permit fusion bonding upon application of heat. A multiplicity of embedded non-olefin fiber elements extends in anchored relation at least partially across the thickness dimension of the mat structure and one or more non-olefin surface layers such that at least a portion of the fiber elements project outwardly from the surface layers and the surface layers in combination with the projecting portions define at least a partial covering across the mat structure. The composite of the mat with anchored non-olefin fiber elements an non-olefin surface layers is moldable to a three-dimensional geometry by application of heat and pressure following formation.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein:

FIG. 1 illustrates schematically a cross-section of the multilayer film;

FIG. 2 illustrates schematically a fabric woven from drawn strips of the multilayer film;

FIG. 3 illustrates schematically a process for forming a fabric woven from drawn strips of the multilayer film;

FIG. 4 illustrates a structure formed from multiple layers of woven mat fabrics formed from drawn strips of film;

FIG. 5 illustrates schematically a process for forming a stitched interface surface across one side of a woven mat fabric formed from drawn strips of film;

FIG. 6 is a needle point diagram illustrating one contemplated arrangement of stitches for forming a stitched interface surface across a woven mat fabric;

FIG. 7 is a view illustrating the stitching arrangement formed according to the needle point diagram of FIG. 6;

FIG. 8 is a cross-sectional view of an exemplary composite construction with a stitched interface surface across a woven mat fabric formed from drawn strips of film and with non-stitched covering layers of a woven mat fabric formed from drawn strips of film;

FIG. 9 illustrates the exemplary composite construction of FIG. 8 held in partially embedded relation within a substrate layer;

FIG. 10 illustrates the exemplary composite construction of FIG. 8 held in partially embedded relation across opposing sides of a substrate layer;

FIG. 11 illustrates schematically a process for forming stitching an interface layer across one side of a woven mat fabric formed from drawn strips of film;

FIG. 12 is a cross-sectional view of an exemplary composite construction with an interface layer stitched across a woven mat fabric formed from drawn strips of film;

FIG. 13 illustrates the exemplary composite construction of FIG. 12 held in bonded partially embedded relation within a substrate layer;

FIG. 14 illustrates the exemplary composite construction of FIG. 12 held in bonded partially embedded relation across opposing sides of a substrate layer; and FIGS. 15 and 16 illustrate alternative practices for securing bondable yarn elements across a woven mat fabric formed from drawn strips of film.

DESCRIPTION OF PREFERRED EMBODIMENTS

Exemplary embodiments of the present invention will now be described by reference to the accompanying drawings, in which, to the extent possible, like reference numerals are used to designate like components in the various views. Turning now to the drawings, FIG. 1 depicts an exemplary construction of multilayer polymeric film 10 made up of a core layer 12 disposed between surface layers 14, 14'. Alternatively, it is contemplated that only a single surface layer may be present, thereby resulting in a construction of a core layer 10 being adjacent to surface layer 14. The film 10 may be formed by any conventional means of extruding such multilayer polymeric films. By way of example, and not limitation, the film 10 may be formed by blown film or cast film extrusion. The film 10 is then cut into a multiplicity of longitudinal strips of a desired width (not shown) by slitting the film 10 to form tapes with cross-sections as shown in FIG. 1. The strips of film 10 are then drawn in order to increase the orientation of the core layer 10 so as to provide increased strength and stiffness of the material.

It is contemplated that the core layer 12 of the film 10 is preferably made up of a molecularly-oriented thermoplastic polymer, the core layer 12 being fusible to each of surface layers 14, 14' at their respective intersections. The core layer 12 is compatibly bonded to each of surface layers 14, 14' between their contiguous surfaces. It is further contemplated that the surface layers 14, 14' have a softening temperature, or melting temperature, lower than that of the core layer 12. By way of example only, it is contemplated that the core layer 12 is a polyolefin polymer such as polypropylene, polyethylene, a polyester such as polyethyleneterephthalate, or a polyamide such as Nylon 6 or Nylon 6-6. According to one potentially preferred practice, the core layer 12 may be polypropylene or polyethylene. The core layer 12 may account for about 50-99 wt. % of the film 10, while the surface layers 14, 14' account for about 1-50 wt. % of the film 10. The core layer 12 and surface layers 14, 14' being made up of the same class of materials to provide an advantage with regard to recycling, as the core layer 12 may include production scrap.

In an embodiment with a core layer 12 of polypropylene, the material of surface layers 14, 14' is preferably a copolymer of propylene and ethylene or an α-olefin. Particularly advantageous results have been achieved by using a random copolymer of propylene-ethylene. It may be preferred to use said copolymer with an ethylene content of about 1-25 mol. %, and a propylene content of about 75-99 mol. %. It may be further preferred to use said copolymer with a ratio of about 95 mol. % propylene to about 5 mol. % ethylene. Instead of said copolymer or in combination therewith, a polyolefin, preferably a polypropylene homopolymer or polypropylene copolymer, prepared with a metallocene catalyst, may be used for the surface layers 14, 14'. It is also contemplated that materials such as poly 4methyl 1pentene (PMP) and polyethylene may be useful as a blend with such copolymers in the surface layers 14, 14'. The surface layer material should be selected such that the softening point of the surface layer 14, 14' is at least about 10° C. lower than that of the core layer 12, and preferably between about 15-40° C. lower. The upper limit of this difference is not thought to be critical, and the difference in softening points is typically less than 70° C.

By way of example only, and not limitation, one film material that may be particularly useful is believed to be marketed under the trade designation PURE by Lankhorst/Indutech having a place of business in Sneek, The Netherlands.

As mentioned above, the film 10 may be cut into a multiplicity of longitudinal strips of a desired width by slitting the film 10 in a direction transverse to the layered orientation of core layer 12 and surface layers 14, 14'. The strips of film 10 are then drawn in order to increase the orientation of the core layer 10 so as to provide increased strength and stiffness to the material. After the drawing process is complete, the resulting strips are in the range of about 1.5 to about 5 millimeters wide.

FIG. 2 illustrates a mat fabric 20 woven from strips of the film 10. As illustrated, the mat fabric 20 preferably includes a multiplicity of warp strips 24 of film 10 running in the warp direction of the mat fabric 20. The warp strips 24 are interwoven with fill strips 26 running in the fill direction in transverse relation to the warp strips 24. As shown, the fill strips 26 are interwoven with the warp strips 24 such that a given fill strip extends in a predefined crossing pattern above and below the warp strips 24. In the illustrated arrangement, the fill strips 26 and the warp strips 24 are formed into a so called plain weave wherein each fill strip 26 passes over a warp strip and thereafter passes under the adjacent warp strip in a repeating manner across the full width of the fabric 20. However, it is also contemplated that any number of other weave constructions as will be well known to those of skill in the art may likewise be utilized. By way of example only, and not limitation, it is contemplated that the fill strips 26 may pass over two or more adjacent warp strips 24 before transferring to a position below one or more adjacent warp strips thereby forming a so-called twill weave. It is likewise contemplated that the mat may utilize other interwoven constructions including knit constructions, weft insertion constructions and the like if desired. Thus, the terms "woven" and "interwoven" are meant to include any construction incorporating interengaging formation strips.

By way of example only, the formation of the mat fabric 20 incorporating a traditional woven structure as described may be understood through reference to the simplified schematic in FIG. 3. As illustrated, in the formation process the warp strips 24 of film 10 may be unwound from a beam 34 and separated into two or more sheets 36, 38 for processing. For example, the sheet 36 may be made up of the even numbered warp strips while the sheet 38 may be made up of odd numbered warp strips across the width of the beam. As illustrated, the sheets 36, 38 are threaded through an arrangement of harnesses 40, 42 which may be moved relative to one another to alternate the relative position of the sheets 36, 38, thereby adjusting the shed or spacing between the sheets. As will be appreciated by those of skill in the art, at the weaving machine the fill strips 26 are inserted through the shed between the sheets 36, 38 while the sheets 36, 38 are in spaced relation to one another. As previously indicated, multiple fill strips 26 may be inserted through the shed so as to be side by side in the same orientation relative to the sheets 36, 38. Thereafter, the harnesses 40, 42 may be adjusted so as to reverse the relative position of the sheets 36, 38. Such reversal opens a new shed through which single or multiple fill strips 26 may be inserted before the process is repeated. As will be appreciated, the formation process as described substantially emulates standard weaving processes as are well known to those of skill in the art.

In order to securely fuse the warp strips 24 to the fill strips 26 while maintaining the interwoven spatial relation between them, it is contemplated that the warp strips 24 and the fill strips 26 will preferably be heated, under pressure, to a temperature above the softening point of surface layers 14, 14' and below that of the core layer 12. In so doing, the surface layers 14, 14' will melt while the core layer 12 will remain substantially solid and highly oriented. As the fabric 20 then cools, the surface layers 14, 14' will fuse together, thereby forming a solid matrix through which is woven the highly oriented, stiff structure of the core layer 12. This fusion may take place either before or after non-olefin fiber elements are embedded across the thickness dimension of the fabric 20 as will be described further hereinafter.

As illustrated in FIG. 4, according to one contemplated practice, several layers of mat fabric 20 may be arranged in layered relation prior to the application of heat and pressure in order to form a multilayered woven structure. The layers of mat fabric 20 may be formed from a single sheet of fabric that is repeatedly folded over itself, or from several discrete overlaid sheets. Alternatively, a multilayered woven composite may be formed by reheating several previously fused layers of the woven mat fabric. When such previously fused material is subjected to a temperature above the softening point of the surface layers 14, 14' and below that of the core layer 12, the matrix will again melt while the core layers remain substantially solid. Upon cooling, the surface layers 14, 14' will again fuse and re-form the matrix. Any of these methods may be employed to form a composite with any desired thickness or number of layers.

Consolidation of multiple layers is preferably carried out at suitable temperature and pressure conditions to facilitate both interface bonding fusion and partial migration of the melted surface layer material between the layers. Heated batch or platen presses may be used for multi-layer consolidation. However, it is contemplated that any other suitable press may likewise be used to provide appropriate combinations of temperature and pressure. According to a potentially preferred practice, heating is carried out at a temperature of about 130-160° C. and a pressure of about 0.5-70 bar. When exposed to such an elevated temperature and pressure, the surface layers 14, 14' will melt while the core layer 12 will remain substantially solid. Upon cooling, the surface layers 14, 14' will fuse thereby forming a matrix through which the stiff core layers 12 are distributed. According to a potentially preferred practice, cooling is carried out under pressure to a temperature less than about 115° C. It is contemplated that maintaining pressure during the cooling step tends to inhibit shrinkage. Without wishing to be limited to a specific theory, it is believed that higher pressures may facilitate polymer flow at lower temperatures. Thus, at the higher end of the pressure range, (greater than about 30 bar) the processing temperature may be about 90-135° C. Moreover, the need for cooling under pressure may be reduced or eliminated when such pressures are utilized to facilitate flow.

Due at least in part to the biaxial orientation of the interwoven, highly oriented core layers 12, which are securely held within a matrix of the fused surface layers 14, 14', a composite structure formed from the woven mat fabric 20 as described will exhibit excellent mechanical strength characteristics in both the planar and normal directions at a low weight. Moreover, such constructions are highly adaptable to forced three-dimensional molding procedures at temperatures above the softening point of the surface layers.

As previously indicated, according to a potentially preferred practice, a multiplicity of non-olefin fiber elements is disposed at least partially across the thickness dimension of the mat structure such that at least a portion of the fiber elements project outwardly from the mat structure. The projecting portions thus define at least a partial surface covering of non-olefin character across the mat structure. The non-olefin fiber elements are preferably anchored in place relative to the mat fabric 20 by the formation of stitches and/or through fusion bonding within the matrix of the mat fabric 20. As will be appreciated, such fusion bonding may be achieved by subjecting the mat fabric 20 with the applied non-olefin fiber elements to an elevated temperature environment sufficient to activate or reactivate the material forming the surface layers 14, 14' thereby causing such material to at least partially encapsulate the non-olefin fiber elements and lock them in place.

By way of example only, one contemplated practice for the introduction of non-olefin fiber elements across the mat fabric 20 is illustrated in FIG. 5. As shown, in this practice a stitching or stitch bonding process as may be used to apply non-olefin stitching yarn or thread 46 through the woven mat fabric 20. As will be appreciated, while FIG. 5 illustrates a single layer of woven mat fabric 20, it is likewise contemplated that multiple interface layers and/or woven mat fabric layers may be utilized if desired. The process may be carried out by stitch boding machines such as MALIMO stitch bonding machines and the like as will be known to those of skill in the art. As shown, the resultant product has an arrangement of yarn elements disposed across a surface of the woven mat fabric.

In the illustrated practice, one or more layers of woven mat fabric 20 formed from multi-layer tape elements as previously described are conveyed to a stitch-forming position. At the stitch-forming position a plurality of stitching yarns 46 are stitched through the mat fabric 20. As illustrated, yarn guides 48 carry the stitching yarns 46 such that adjacent reciprocating needles 54 alternately engage the stitching yarns 46. As will be appreciated, while only a single needle 54 is illustrated for purposes of simplicity, multiple needles are arranged in side by side relation in the cross-machine direction. Likewise, multiple yarn guides 48 are arranged in the cross-machine direction to carry multiple stitching yarns. As yarns are passed back and forth between adjacent needles, rows of stitches 53 (FIG. 7) are formed across the underside or so called "technical face" of the formed composite with a zig zag arrangement of crossing yarns 55 across the top or so called "technical back" of the formed composite. As shown, sinker fingers 57 are preferably arranged so as to compress the layers together without engaging the stitching yarns 46.

In the exemplary practice, the needle 54 (which is shown in greatly exaggerated dimension) pierces the woven mat fabric 20 and engages the stitching yarn 46 such that the stitching yarn 46 is captured within a hook portion of the needle 54. As the needle 54 is reciprocated downwardly, a closing element 47 such as a closing wire, which moves relative to the needle 54, closes the hook portion to hold the stitching yarn therein. With the hook portion closed, the stitching yarn 46 is pulled through an immediately preceding stitch 53 disposed around the shank of the needle 54 at a position below the interface layer 60. As the stitching yarn 46 is pulled through the interior of the preceding stitch 53, the preceding stitch 53 is knocked off of the needle 54 and a new stitch is established by the portion of the stitching yarn held within the hook portion of the needle. As the needle 54 is raised back through the interface layer 44 and woven mat fabric 20 to the position illustrated in FIG. 5, the hook portion is reopened and the new stitch moves out of the hook portion and is held around the shank of the needle for acceptance of a subsequent stitch during the next downstroke.

A needle point diagram illustrating a typical fully threaded stitch pattern is illustrated in FIG. 6. As will be appreciated by those of skill in the art, this construction utilizes a traditional chain stitch arrangement such that every time the yarn travels around a needle there is a yarn at the preceding needle location. That is, every time a segment of the stitching yarn 46 is pulled through the substrate, that segment engages a loop formed during the preceding stroke. This arrangement gives rise to a pattern of engaging stitches 53 (FIG. 7) extending in substantially parallel rows in the machine direction across the surface below mat fabric 20 (i.e. across the technical face) of the structure. The crossing segments 55 of the stitch yarns running between the stitch rows across the technical back are shown as hidden lines. As will be appreciated, the engaging stitches 53 cooperate with one another in the machine direction of the fabric in a substantially stable interlocking relation thereby anchoring the yarns in place and securing the layers together to form a stable composite 58. As best seen in the cross-sectional view of FIG. 8, the formed composite 58 incorporates a layer of woven mat fabric 20 with segments of stitching yarn 46 disposed across at least a portion of the surface. Depending upon the density of stitches utilized and the construction of the stitching yarn, the stitching yarn 46 may substantially cover the woven mat fabric 20 or may be present in a relatively sparse arrangement. As shown, after the stitching yarns the composite 58 may be passed through a heater 59 to fuse the stitching yarns in place.

In the illustrated and described arrangement, the outwardly projecting portions of the stitching yarns define a non-olefin contact surface adapted for mechanical and/or chemical adhesion to substrates that typically do not adhere to the olefin surfaced mat fabric 20. By adjustment of the stitch density and character, it has been found that the adhesion characteristics may likewise be adjusted. The stitching yarns 46 are preferably polyester, although other non-olefin yarn materials such as nylon, cotton, aramid and the like may also be used.

As illustrated in FIG. 9, the formed composite 58 (woven fabric with inserted stitching yarns) may be applied in laminate relation across a surface of a substrate material 70 such as adhesive, resin, foam, plastic, rubber, or the like with the projecting portions of the non-olefin stitching yarns 46 providing secure attachment. That is, the non-olefin stitching yarns bond to the substrate while also being locked into the mat fabric 20 thereby avoiding undesired delamination. By way of example only, and not limitation, exemplary substrate materials that are bondable to such a formed composite may include polyurethane, acrylic, methacrylic, epoxy, hot melt, cyanoacrylate, phenolics, unsaturated polyester resins, melamine and combinations thereof. Such materials typically exhibit poor adhesion relative to olefin structures such as the mat fabric 20. While the substrate material 70 is shown as a single layer, it is likewise contemplated that multiple layers of the same or different material may be used. By way of example only, the substrate material 70 may include an adhesive disposed in contacting relation with the formed composite 58 with one or more underlying layers such as foam, rubber or other material.

As illustrated, one or more additional layers of the mat fabric 20 may be placed in covering relation across the face of the formed composite 58 facing away from the substrate material 70. Such additional layers thus provide a surface covering over the stitching yarn 46 thereby defining an outer face that is free of projecting yarn segments. Of course, such additional layers are optional and the formed composite 58 may define the outer face if desired.

If desired, the composite 58 and any covering layers may be molded before, after or during application to the substrate. According to one contemplated practice, it is contemplated that the composite 58 may be applied across the surface of a heat curable substrate 70 such as a curable foam with heat and pressure then being applied to mold and fuse the composite 58 while simultaneously curing the substrate 70. Thus, a three-dimensional structure may be formed having matched curvature between the surface and substrate layers with little retained stress. Of course, the composite 58 and substrate 70 may also be substantially flat as illustrated in FIG. 9.

It is also contemplated that a composite 58 as previously described may be applied across opposing surfaces of a substrate 70 (FIG. 10) either with or without additional surface-defining covering layers. In such a construction, the composites 58 on either side may be either similar or dissimilar depending on the desired environment of use. As with the single side covering, the final structure may be either molded or flat. While the substrate material 70 is shown as a single layer, it is likewise contemplated that multiple layers of the same or different material may be used. By way of example only, the substrate material 70 may include an adhesive disposed in contacting relation with the formed composite 58 with one or more underlying layers such as foam, rubber or other material. Of course, the use of additional surface-defining covering layers may be limited to a single side if desired.

FIG. 11 illustrates another contemplated construction practice wherein elements corresponding to those previously described are designated by like reference numerals within a 100 series. In the illustrated construction, a fibrous textile interface layer 144 is secured across at least one side of the woven mat fabric 120 or multi-layer composite formed therefrom. The interface layer 144 is preferably secured in place by mechanical fibrous attachment techniques such as the stitch bonding practices previously described wherein fibrous non-olefin stitching yarns 146 extend in connecting relation between the adjoined layers.

By way of example only, and not limitation, FIG. 11 illustrates a stitching or stitch bonding process as may be used to join a fibrous textile interface layer 144 such as a woven, knit or non-woven fabric to the underside of a woven mat fabric 120 as previously described. As will be appreciated, while FIG. 11 illustrates a single layer of woven mat fabric 120 in combination with a single interface layer 144, it is likewise contemplated that multiple interface layers and/or woven mat fabric layers may be utilized if desired. The process may be carried out by stitch bonding machines such as MALIMO stitch bonding machines and the like as will be known to those of skill in the art.

In the illustrated practice, one or more layers of woven mat fabric 120 formed from multi-layer tape elements as previously described are conveyed to a stitch-forming position. At the stitch-forming position a plurality of stitching yarns 146 are stitched through the interface layer 144 and mat fabric 120. As illustrated, yarn guides 148 carry the stitching yarns 146 such that adjacent reciprocating needles 54 alternately engage the stitching yarns 146. As will be appreciated, while only a single needle 154 is illustrated for purposes of simplicity, multiple needles are arranged in side by side relation in the cross-machine direction. Likewise, multiple yarn guides 148 are arranged in the cross-machine direction to carry multiple stitching yarns. As yarns are passed back and forth between adjacent needles, rows of stitches are formed across the underside or so called "technical face" of the formed composite with a zig zag arrangement of crossing yarns across the top or so called "technical back" of the formed composite. As shown, sinker fingers 157 are preferably arranged so as to compress the layers together without engaging the stitching yarns 146.

As will be appreciated the stitching practice is substantially identical to that described in relation to FIGS. 5-7. However, in the instant practice, the stitching yarns 146 provide the additional function of holding the interface layer 144 in place. Thus, in the resultant product a multiplicity of non-olefin fiber elements in the form of stitching yarns 146 is disposed at least partially across the thickness dimension of the mat structure such that at least a portion of the fiber elements secure the interface layer 144 in place relative to the mat fabric 120 with portions of the fiber elements projecting outwardly from the interface layer the mat structure. The projecting portions in combination with the interface layer 144 thus define at least a partial surface covering of non-olefin character across the mat structure. The stitching yarns 146 are preferably anchored in place relative to the mat fabric 120 and interface layer 144 by the formation of stitches and/or through fusion bonding within the matrix of the mat fabric 120. As will be appreciated, such fusion bonding may be achieved by subjecting the mat fabric 120 with the applied non-olefin stitching yarns fiber elements to an elevated temperature environment sufficient to activate or reactivate the material forming the surface layers 14, 14' thereby causing such material to at least partially encapsulate the non-olefin fiber elements and lock them in place.

As previously indicated, the interface layer 144 is preferably a fibrous textile construction such as a woven, non-woven or knit fabric adapted for bonding attachment to an underlying substrate material. In this regard, the interface layer 144 in combination with projecting portions of the stitching yarns provides a suitable bonding surface for substrate materials including adhesives, resins, foams rubbers and the like as previously described that do not readily bond to olefins such as form the mat fabric 120. One material that has been found to be particularly suitable for the interface layer 144 is a non-woven polyester fabric having a mass per unit area of about 50 to about 300 grams per square meter. However, other fabric constructions and materials may be used including woven, non-woven or knit constructions incorporating non-olefin materials such as polyester nylon, cotton, aramid and the like.

As illustrated in FIG. 12, the formed composite 158 may be applied in laminate relation across a surface of a substrate material 170 such as adhesive, resin, foam, plastic, rubber, or the like with the interface layer 144 and the projecting portions of the non-olefin stitching yarns 146 providing secure attachment. By way of example only, and not limitation, exemplary substrate materials that are bondable to such a formed composite may include polyurethane, acrylic, methacrylic, epoxy, hot melt, cyanoacrylate, phenolics, unsaturated polyester resins, melamine and combinations thereof. Such materials typically exhibit poor adhesion relative to olefin structures such as the mat fabric 120. While the substrate material 170 is shown as a single layer, it is likewise contemplated that multiple layers of the same or different material may be used. By way of example only, the substrate material 170 may include an adhesive disposed in contacting relation with the formed composite 158 with one or more underlying layers such as foam, rubber or other material.

As illustrated, one or more additional layers of the mat fabric 120 may be placed in covering relation across the face of the formed composite 158 facing away from the substrate material 170. Such additional layers thus provide a surface covering over the stitching yarn 146 thereby defining an outer face that is free of projecting yarn segments. Of course, such additional layers are optional and the formed composite 158 may define the outer face if desired.

To any extent desired, the composite 158 may be molded before, after or during application to the substrate. According to one contemplated practice, it is contemplated that the composite 158 may be applied across the surface of a heat curable substrate 170 such as a curable foam with heat and pressure then being applied to mold and fuse the composite 158 while simultaneously curing the substrate 170. Thus, a three-dimensional structure may be formed having matched curvature between the surface and substrate layers with little retained stress. Of course, the composite 158 and substrate 170 may also be substantially flat as illustrated in FIG. 13.

It is also contemplated that a composite 158 as previously described may be applied across opposing surfaces of a substrate 170 (FIG. 14) either with or without additional surface-defining covering layers. In such a construction, the composites 158 on either side may be either similar or dissimilar depending on the desired environment of use. As with the single side covering, the final structure may be either molded or flat. While the substrate material 170 is shown as a single layer, it is likewise contemplated that multiple layers of the same or different material may be used. By way of example only, the substrate material 170 may include an adhesive disposed in contacting relation with the formed composite 158 with one or more underlying layers such as foam, rubber or other material. Of course, the use of additional surface-defining covering layers may be limited to a single side if desired.

Surprisingly, it has been found that the incorporation of an interface layer 144 provides an attractive bonding surface for substrate materials 170 without adversely impacting the ability to thermo-form the attached mat fabric 120 to complex three dimensional shapes. In this regard it is believed that the mechanical stitching attachment between the mat fabric 120 and the interface layer 144 establishes a mechanical bonding relationship across the intersection that simultaneously holds the layers together while still allowing for localized separations at interstitial zones between the stitching yarns such that pliability is substantially retained.

It is to be understood that any number of techniques other than stitch bonding may be utilized to introduce non-olefin fiber elements across one or more layers of mat fabric and any interface layers as may be utilized while still obtaining a desired secure bonding arrangement. By way of example only, and not limitation, in FIG. 15 an alternative formation process is illustrated. As shown, this process corresponds substantially to that illustrated and described in relation to FIGS. 5 and 11 with the exception that the reciprocating needles are replaced by a pair of tufting needles 280 which cooperatively insert and withdraw a non-olefin yarn 246 through a mat fabric 220 as previously described and any interface layer (not shown) as may be desired. Such tufting forms a surface arrangement of projecting yarn elements 250 adapted to facilitate bonding adhesion to various substrates as previously described. Of course, such a process may be used with any of the yarns previously described, but may be most suitable for yarns of relatively high denier. Although the tufted yarns 246 do not incorporate anchoring stitches, they may nonethelss be anchored in place by fusion bonding by subjecting the mat fabric 220 with the applied non-olefin tufted yarns to an elevated temperature environment such as a heater 259 sufficient to activate or reactivate the material forming the surface layers 14, 14' thereby causing such material to at least partially encapsulate the non-olefin fiber yarns and lock them in place.

By way of further example, in FIG. 16 an alternative formation process is illustrated wherein the reciprocating needles are replaced by reciprocating needles 362 of open forked construction. As will be appreciated, the needles 362 are adapted to periodically engage the yarn 346 as previously described at a position above a mat fabric 320 as previously described and thereafter push that yarn 346 through the mat fabric 320 and any desired interface layers (not shown). Such insertion forms a surface arrangement of projecting yarn elements 250 adapted to facilitate bonding adhesion to various substrates as previously described. Although the inserted yarns 346 do not incorporate anchoring stitches, they may nonetheless be anchored in place by fusion bonding by subjecting the mat fabric 320 with the applied non-olefin tufted yarns to an elevated temperature environment such as a heater 359 sufficient to activate or reactivate the material forming the surface layers 14, 14' thereby causing such material to at least partially encapsulate the non-olefin fiber yarns and lock them in place.

EXAMPLES

Aspects of the invention may be further understood through reference to the following non-limiting examples. In all examples stitching was carried out using a Malimo stitch bonding apparatus forming stitches at a density of 12.5 courses/inch×7 wales/inch using a 150 denier textured polyester stitching yarn.

Example 1

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

B Staged unsaturated polyester coated glass mat;
Stitch bonded composite with spunbond facing the coated glass;
20 layers of the twill weave mat fabric sans spunbond;
Stitch bonded composite with spunbond facing away from the 20 layers;
B Staged unsaturated polyester coated glass mat.

The stacked layers were placed in platen press at 295 F. Applied 450 psi pressure. Heated for 15 minutes. Cooled to 150F. Released pressure and removed from press.

Example 2

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

B Staged phenolic saturated Kraft paper (3 layers);
Stitch bonded composite with spunbond facing the paper;
20 layers of the twill weave mat fabric sans spunbond;
Stitch bonded composite with spunbond facing away from the 20 layers;
B Staged phenolic saturated Kraft paper (3 layers).

The stacked layers were placed in a platen press at 285F. Applied 600 psi pressure. Heated 4 minutes. Cooled to 150F. Released pressure and removed from press.

Example 3

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2420 (1.85 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

Stitch bonded Composite
9 layers of the twill weave mat fabric sans spunbond;

The stacked arrangement with the spunbond facing out was placed in a platen press at 300F, applied 300 psi pressure and heated 1 minute. The structure was then cooled to 200F, released pressure and removed from press.

A 10 cm×10 cm sample of the aforementioned consolidated sheet was placed in an equivalent sized mold with the spunbond surface facing up. 18 g Tectrade Desmodur 44U20L isocyanate and 15 g Tecphen P-42A-140 CP polyol were mixed, and this polyurethane foam mixture was poured onto the sheet in the mold. Another sample of the aforementioned consolidated sheet with the spunbond surface facing the foam precursor was placed in the mold, and the mold was closed to limit the composite thickness to 1 inch. The foam expanded and set. The resultant composite was demolded after 30 minutes.

Example 4

A multiplicity of fusible mono-axially drawn tape elements as previously described having dimensions of 2.2 mm wide×65 microns thick was formed into a twill plain weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

Stitch bonded composite with spunbond facing the paper;
19 layers of the twill weave mat fabric sans spunbond.

The stacked arrangement with the spunbond facing out was placed in a platen press at 300F, applied 300 psi pressure and heated 2 minutes. The structure was then cooled to 200F, released pressure and removed from press.

A 10 cm×10 cm specimen of the aforementioned consolidated sheet was placed in an equivalent sized mold with the spunbond layer facing up. 18 g Tectrade Desmodur 44U20L isocyanate and 15 g Tecphen P-42A-140 CP polyol were mixed, and this polyurethane foam mixture was poured onto the sheet in the mold. Another specimen of the consolidated sheet with the spunbond layer facing the foam precursor was placed in the mold, and the mold was closed to limit the composite thickness to 1 inch. The foam expanded and set. The resultant composite was demolded after 30 minutes.

Example 5

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/ inch with a 150 denier textured polyester stitching yarn to form a stitch bonded composite. The stitch bonded composite was stacked in the following layered arrangement:

3 layers Kraft paper—B staged phenolic saturated Kraft paper
Stitch bonded composite with spunbond surface facing the paper;
2 layers of the mat fabric in a twill weave sans spunbond.

The stacked arrangement was placed in platen press at 285F. Applied 450 psi pressure and heated 4 minutes. The structure was then cooled to 200F and removed from the press.

Example 6

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2420 (1.85 osy) using a Malimo stitch bonding apparatus forming stitches at a density of 12.5 courses/inch×7 wales/ inch with a 150 denier textured polyester stitching yarn to form a stitch bonded composite. The stitch bonded composite was stacked in the following layered arrangement:

3 layers Kraft paper—B staged phenolic saturated Kraft paper
Stitch bonded composite with spunbond facing the paper;
2 layers of the mat fabric in a twill weave sans spunbond.

The stacked arrangement was placed in platen press at 285F. Applied 450 psi pressure and heated 4 minutes. The structure was then cooled to 200F and removed from press.

Control Example

The following layers were stacked together and consolidated in the in the arrangement as follows:
Layers
3 layers Kraft paper—B staged phenolic saturated Kraft paper
2 layers of the mat fabric in a twill weave sans spunbond.
Consolidation Process
Placed in platen press at 285F. Applied 450 psi pressure. Heated 4 minutes.
Cooled to 200F. Released pressure and removed from press.

Peel Strength Data

Samples were tested using a 1"×6" sample peeled at 90 degrees (ASTM D5170). The average peel force required to separate the MFT and tie layer from the Kraft paper is reported.

| Sample | Average Peel (lbf) |
|---|---|
| Control Example | 0.0 |
| Example 5 | 1.9 |
| Example 6 | 2.1 |

The control example demonstrates the dramatic increase in adhesion achieved using the intermediate attachment layer.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations as may incorporate the broad aspects of the present invention within the full spirit and scope of the following claims and all equivalents thereto.

The invention claimed is:

1. A composite construction comprising:
a mat structure comprising a plurality of layers, each layer comprising a plurality of monoaxially drawn tape elements, said tape elements comprising a base layer of a strain oriented polymer disposed between covering layers of a heat fusible polymer, wherein said covering layers are characterized by a softening temperature below that of the base layer to permit fusion bonding upon application of heat, and wherein the plurality of layers are fused together;

a multiplicity of embedded fiber elements extending in anchored relation across the thickness dimension of the mat structure such that at least a portion of the fiber elements project outwardly from the mat structure and the projecting portions define at least a partial surface covering across a first side of the mat structure and at least a partial surface covering across a second side of the mat structure;

a substrate layer disposed in layered relation to the mat structure such that at least a percentage of said portion of the embedded fiber elements projecting outwardly from the mat structure is at least partially bonded to a surface portion of the substrate layer; and, at least one additional layer disposed across a second side of the mat structure facing away from the substrate layer such that said at least one additional layer defines an encapsulating barrier layer over the mat structure to substantially cover portions of the fiber elements projecting outwardly from the second side of the mat structure.

2. The composite composition of claim 1, wherein the monoaxially drawn tape elements comprise an olefin polymer.

3. The composite composition of claim 1, wherein the embedded fiber elements comprise a non-olefin material.

4. The composite construction of claim 1, wherein the multiplicity of embedded fiber elements comprise a multiplicity of embedded stitching yarns extending in stitch-forming anchored relation across the mat structure such that at least a portion of the stitching yarns project outwardly from the mat structure.

5. The composite construction of claim 1, wherein at least a portion of the embedded fiber elements are locked within the mat structure by heat fused portions of the tape elements.

6. The composite construction of claim 1, wherein the embedded fiber elements are anchored in tufted relation within the mat structure by heat fused portions of the tape elements.

7. The composite construction of claim 1, wherein the substrate layer comprises an adhesive.

8. The composite construction of claim 7, wherein said adhesive is selected from the group consisting of polyurethane, acrylic, methacrylic, epoxy, hot melt, cyanoacrylate, phenolics, unsaturated polyester resins, melamine and combinations thereof.

9. A composite construction comprising:

a mat structure comprising a plurality of layers, each layer comprising a plurality of monoaxially drawn tape elements, said tape elements comprising a base layer of a strain oriented polymer disposed between covering layers of a heat fusible polymer, wherein said covering layers are characterized by a softening temperature below that of the base layer to permit fusion bonding upon application of heat, and wherein the plurality of layers are fused together;

a multiplicity of embedded fiber elements extending in anchored relation across the thickness dimension of the mat structure such that at least a portion of the fiber elements project outwardly from the mat structure and the projecting portions define at least a partial surface covering across a first side of the mat structure and at least a partial surface covering across a second side of the mat structure; and a substrate layer disposed in layered relation to the mat structure such that at least a percentage of said portion of the embedded fiber elements projecting outwardly from the mat structure is at least partially bonded to a surface portion of the substrate layer; and, at least one additional layer comprising a plurality of monoaxially drawn tape elements disposed across a second side of the mat structure facing away from the substrate layer such that said at least one additional layer defines an encapsulating barrier layer over the mat structure to substantially cover portions of the fiber elements projecting outwardly from the second side of the mat structure, said tape elements comprising a base layer of a strain oriented olefin polymer disposed between covering layers of a heat fusible olefin polymer, wherein said covering layers are characterized by a softening temperature below that of the base layer to permit fusion bonding upon application of heat.

10. A composite construction comprising:

a mat structure comprising a plurality of layers, each layer comprising a plurality of monoaxially drawn tape elements, said tape elements comprising a base layer of a strain oriented polymer disposed between covering layers of a heat fusible polymer, wherein said covering layers are characterized by a softening temperature below that of the base layer to permit fusion bonding upon application of heat, and wherein the plurality layers are fused together;

at least one interface layer disposed in layered relation to a first side of the mat structure;

a multiplicity of embedded fiber elements extending in anchored relation across the thickness dimension of the mat structure and the interface layer such that at least a portion of the fiber elements project outwardly from the interface layer and at least a portion of the fiber elements project outwardly from a second side of the mat structure, the interface layer in combination with said portion of the fiber elements projecting outwardly from the interface layer defining at least a partial covering across the mat structure;

a substrate layer disposed in layered relation to the mat structure in contacting, bonding relation with said interface layer such that at least a percentage of said interface layer is at least partially bonded to a surface portion of the substrate layer; and, at least one additional layer disposed across a second side of the mat structure facing away from the substrate layer such that said at least one additional layer defines an encapsulating barrier layer over the mat structure to substantially cover portions of the fiber elements projecting outwardly from the second side of the mat structure.

11. The composite composition of claim 10, wherein the monoaxially drawn tape elements comprise an olefin polymer.

12. The composite composition of claim 10, wherein the embedded fiber elements are non-olefin.

13. The composite construction of claim 10, wherein the multiplicity of embedded fiber elements comprise a multiplicity of embedded stitching yarns extending in stitch-forming anchored relation across the mat structure such that at least a portion of the stitching yarns project outwardly from the mat structure, said portion of the stitching yarns projecting outwardly from the interface layer defining at least a partial covering across the mat structure.

14. The composite construction of claim 10, wherein said interface layer is a non-woven textile.

15. The composite construction of claim 10, wherein at least a portion of the embedded fiber elements are locked within the mat structure by heat fused portions of the tape elements.

16. The composite construction of claim 10, wherein said substrate layer comprises an adhesive.

17. A composite construction comprising:

a mat structure comprising a plurality of layers, each layer comprising a plurality of monoaxially drawn tape elements, said tape elements comprising a base layer of a strain oriented polymer disposed between covering layers of a heat fusible polymer, wherein said covering layers are characterized by a softening temperature below that of the base layer to permit fusion bonding upon application of heat, and wherein the plurality layers are fused together;

at least one interface layer disposed in layered relation to a first side of the mat structure;

a multiplicity of embedded fiber elements extending in anchored relation across the thickness dimension of the mat structure and the interface layer such that at least a portion of the fiber elements project outward from the interface layer and at least a portion of the fiber elements project outwardly from a second side of the mat structure, the interface layer in combination with said portion of the fiber elements projecting outwardly from the interface layer defining at least a partial covering across the mat structure;

a substrate layer disposed in layered relation to the mat structure in contacting, bonding relation with said interface layer such that at least a percentage of said interface layer is at least partially bonded to a surface portion of the substrate layer; and, at least one additional layer comprising a plurality of monoaxially drawn tape elements disposed across a second side of the mat structure facing away from the substrate layer such that said at least one additional layer defines an encapsulating barrier layer over the mat structure to substantially cover portions of the fiber elements projecting outwardly from the second side of the mat structure, said tape elements comprising a base layer of a strain oriented olefin polymer disposed between covering layers of a heat fusible olefin polymer, wherein said covering layers are characterized by a softening temperature below that of the base layer to permit fusion bonding upon application of heat.

\* \* \* \* \*

UNITED STATES PATENT AND TRADEMARK OFFICE
CERTIFICATE OF CORRECTION

| | | |
|---|---|---|
| PATENT NO. | : 7,294,383 B2 | Page 1 of 1 |
| APPLICATION NO. | : 11/518963 | |
| DATED | : November 13, 2007 | |
| INVENTOR(S) | : Eleazer et al. | |

It is certified that error appears in the above-identified patent and that said Letters Patent is hereby corrected as shown below:

In column 15, line 64, after the word "structure;" delete the word "and".

Signed and Sealed this

Fifteenth Day of April, 2008

JON W. DUDAS
*Director of the United States Patent and Trademark Office*